July 28, 1925.

H. W. HILL

LENS MEASURING ATTACHMENT

Filed Oct. 27, 1923

1,547,325

INVENTOR
HARRY W. HILL.
BY
Harry H. Styll.
ATTORNEY

Patented July 28, 1925.

1,547,325

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-MEASURING ATTACHMENT.

Application filed October 27, 1923. Serial No. 671,097.

*To all whom it may concern:*

Be it known that I, HARRY W. HILL, a citizen of the United States, residing at Southbridge, in the county of Worcester and State of Massachusetts, have invented certain new and useful Improvements in Lens-Measuring Attachments, of which the following is a specification.

The present invention relates to an improved attachment for use upon lens measuring and testing instruments.

This invention is designed for particular use on such instruments where a large quantity of lenses are to be examined, wherein the powers of said lenses are presumed to be the same, wherein by the use of this invention the work in so examining the instruments will be greatly expedited.

An important object of the invention is to provide an attachment of this nature wherein the instrument may be set by means of a standard lens whose power is known, whereby the lenses to be tested may be quickly handled and checked up.

Another very important object of the invention is to provide an attachment of this nature that may be quickly and readily manipulated, at the same time being of such construction that it will not greatly add to the cost of the instrument upon which it is used.

Another very important object of the invention is to provide an attachment of this nature that is very strong, durable, simple, and inexpensive in construction and manufacture, and one which is well adapted to the uses for which it is designed.

Other objects and advantages of the invention will become apparent during the course of the following description.

In the drawings, wherein like numerals are employed to designate like parts throughout the same:

Figure 1:
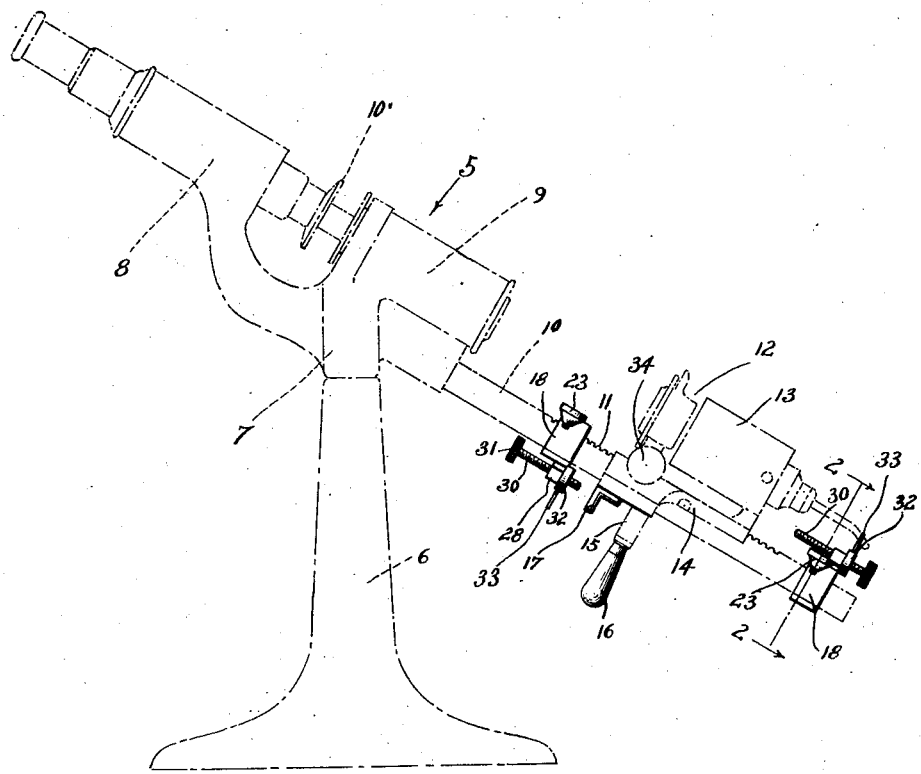
Figure 1 is a side elevation of one form of instrument with which the attachment may be used, said instrument being shown in dotted lines, while the attachments are shown in full lines.
Figures 2, 3, 4:
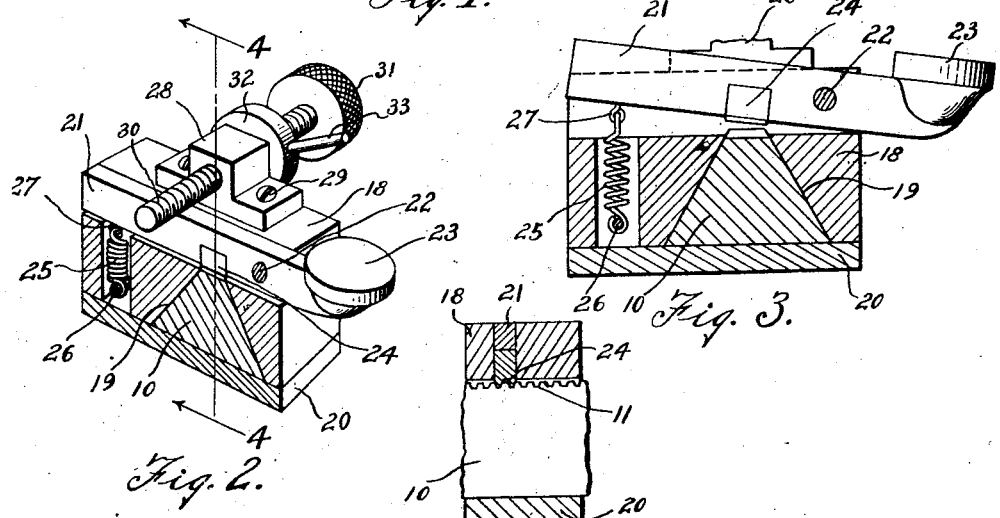
Figure 2 is a section taken on line 2—2 of Figure 1 and looking in the direction of the arrow.
Figure 3 is a similar section showing the device in inoperative position.
Figure 4 is a fragmentary section taken on line 4—4 of Figure 2, looking in the direction of the arrows.

In the drawings, wherein for the purpose of illustration is shown the preferred embodiment of the invention, the numeral 5 designates one form of instrument in its entirety which comprises an optical system adapted to determine the focal power of lenses in conjunction with a movable target, and comprises a base portion or standard 6, upon which is mounted the head 7. The head 7 comprises a pair of arms or branch portions 8 and 9, respectively, with aligned bores or passages containing the optical system, as will be readily understood. The instrument will determine the focal power of a spherical lens whose power is the same in all meridians, as well as the powers of cylindrical, toric or aspherical lenses in any meridian; cylindrical and toric lenses being usually tested in the two major meridians at right angles to each other. Secured at the upper portion or terminus of the passage in the branch 8 is a suitable lens support, said lenses being of the proper arrangement for this type of instrument. The numeral 10' designates the lens to be tested, which is clamped in place by suitable means. Disposed at the rear is a guide bar or rack 10 having the teeth 11 upon which is mounted the movable target and lamp cage 12 and 13, respectively. The carriage 14 which supports the members 12 and 13 is provided with a depending tubular member 15 which contains a frictional member to maintain the carriage 14 in desired adjusted position. In accordance with the present invention a handle 16 is fastened to the member 15, whereby the carriage 14 may be readily shifted in either direction, as desired. In addition to the handle 16 an angle member 17 is mounted on the lower face of the carriage 14 for the purposes that will be readily understood hereinafter.

The main part of my invention comprises a body portion 18, which is provided with an opening 19 which is of a size and shape to accommodate the reception of the rack or arm 10. A removable plate 20 is mounted on the bottom face of the body, as is clearly shown in the drawings. A transversely arranged lever 21 is pivotally mounted in a transversely arranged slot formed in the body 18, as at 22, and is provided at one end with the finger portion 23. A removable toothed section 24 is carried by the lever 21, which is adapted to engage the teeth 11 on the rack or arm 10. To normally urge the teeth 24 into engagement with the rack, a suitable spring member 25 carried by a fixed pin 26 mounted within the body and connected at its opposite end by means of a depending hook 27 to the pivoted lever, is provided. It will thus be seen that to disengage the teeth 24 from the teeth 11 the finger portion 23 is depressed, but upon release of the finger portion the spring 25 will immediately return the teeth into engagement.

Mounted on the top of the block or body portion 18 is arranged a block 28 which is held in place by means of the screws 29. A screw threaded shaft 30 is mounted through the block 28 and is disposed at right angles to the pivoted lever 21. The screw threaded shaft 30 is provided at one end with the operating member 31 so as to facilitate movement of the shaft through the block 28. A disc 32 having a centrally disposed threaded aperture is mounted on the shaft between the block 28 and the operating member 31, and is provided with a radially disposed finger 33, by which means the disc 32 may be rotated on the shaft. It will thus be seen that upon rotation of the disc 32 by means of the finger 33, said disc may be jammed against the block 28, the outer face of which is flush with the end of the block 18, thus adequately locking the shaft against accidental displacement.

In use an attachment similar to the one just described is mounted on the bar 10 in advance of the carriage 14 in such a manner that the screw threaded shaft 30 can be made to contact with the angle member 17. Mounted on the bar 10 and in back of the carriage 14 is a similar attachment to that just described, which is the same in all respects except that the block 28 with its adjuncts are mounted on the top thereof instead of the bottom, so that the screw threaded shaft 30 of this member will contact with the carriage 14. A standard lens, preferably from a trial case, is then placed as at 10, whereby the carriage 14 is moved first in one direction and then the other until the meridian in one power is properly focused, whereby assuming that it is the meridian whereby the carriage will be nearest the inner end of the bar 10, the block 18 will be slid along until the screw shaft 30 approximately contacts with the angle member 17, whereby careful adjustment may be had by rotating the shaft 13 until it actually contacts with said angle member. The locking disc 32 is then jammed against the block 28 so as to maintain its adjustment. The carriage 14 is then moved rearwardly, either by means of the wheel 34 or the handle 16, until the other meridian has been properly focused, whereby the second attachment is placed into position with the shaft 30 contacting with the carriage 14 and locked against accidental displacement. The trial lens is then removed and the lenses, which are all presumed to be of the same powers, are placed one after the other in position to be examined, whereupon the person so examining them will first pull the carriage 14 forward so that the shaft 30 will contact with the angle member 17 and can thus determine whether or not the proper power is shown. After this meridian has been tested the carriage is then shoved rearwardly by means of the handle 16 until the said carriage 14 contacts with the shaft 30, whereupon the second meridian may be tested. In this way there is no necessity of setting the carriage 14 for every test that is made, and it will readily be seen that a considerable amount of time will be saved in testing lenses of the same power. Of course, if the lens is not in the proper focus the error can be readily determined and removed from this group of lenses.

It will, of course, be seen that this attachment is exceptionally desirable where great stocks of lenses are to be measured, as above described.

It is to be understood that the form of my invention herewith shown and described is to be taken as the preferred embodiment of the same and that various changes in the size, shape and arrangement of parts may be resorted to without departing from the spirit of the invention or the scope of the subjoined claims.

Having thus described my invention, what I claim is:

1. In combination with a lens testing and measuring instrument, including a rack portion and a carriage slidably mounted thereon, of a device of the character described comprising a body portion slidably mounted on said rack portion, a pivoted lever associated with the body portion and adapted to interlock with the rack portion, a screw threaded shaft carried by the body portion and arranged transversely of the pivoted lever, means to move the screw threaded shaft into contact with said carriage, and means to lock the threaded shaft into the desired adjustment.

2. In combination with a lens testing and measuring instrument, including a rack bar and a slidable carriage, of a device of the character described, comprising a body portion slidably mounted on said rack bar, a pivoted lever carried by the body portion, a toothed portion carried by the pivoted lever and adapted for engagement with the rack bar, spring means to normally hold said toothed portion in engagement with the rack bar, means to disengage the toothed portion, a block mounted on the body portion, a shaft operable therethrough, means to lock the shaft in desired adjustment, and means to move said slidable carriage on the rack bar into contact with said shaft.

3. In combination with a lens testing and measuring instrument including a rack bar, a slidable carriage mounted thereon, of a device of the character described, comprising a body portion slidably mounted on the rack bar, a pivoted lever carried by the body portion, a toothed portion engageable with the rack bar, spring means to normally hold the toothed portion in engagement with the rack bar, means to disengage the toothed portion, a block mounted on the body portion, a screw threaded shaft operable therethrough, means to lock the threaded shaft in desired adjustment, an angular member carried by said slidable carriage on the rack bar adapted to contact with said screw threaded shaft, and means to move said angular member into engagement therewith.

4. In combination with a lens testing instrument including a movable cage and an optical system for determining the power of a lens in two meridians, of a pair of stops, said cage being movable to first one of said stops to check the power in one meridian, and then movable to the other of said stops to check the power of the other meridian.

5. In combination with a lens testing instrument comprising an optical system for determining the power of a lens, a guide bar and a movable target on the guide bar, of a stop on the guide bar between the optical system and the target, means for locking the stop in desired position on the guide bar, and adjustable means on the stop for changing the distance between the stop and the movable target.

6. In combination with a lens testing instrument comprising an optical system for determining the power of a lens, a guide bar and a target slidable on the guide bar, a stop on the guide bar between the optical system and the target, means for locking the stop in desired position on the guide bar, adjustable means for changing the distance between the target and the stop, a second stop on the opposite side of the target, means for locking the stop in desired position on the guide bar, and adjustable means for changing the distance between the stop and the target.

7. The combination with a lens testing instrument, including an optical system for determining the power of a lens in various meridians, a guide bar and a target slidable on the guide bar, of a stop on the guide bar between the optical system and the target located on the guide bar at such a position that when the target is moved into contact with the stop the focal power of the lens to be tested will be determined in one meridian, and a second stop located on the guide bar on the opposite side of the target at such a position that when the target is moved into contact with the stop the power of the lens to be tested will be determined in the major meridian at right angles to the first.

8. The combination with a lens testing and measuring instrument, including a rack portion and a carriage slidably mounted thereon, of a device of the character described, comprising a body portion slidably mounted on said rack portion, a pivoted lever associated with the body portion adapted to interlock with the rack portion, an adjustable member carried by the body portion and arranged transversely of the pivoted lever, and means to move the carriage into contact with the adjustable member.

9. The combination with a lens testing and measuring instrument, including a rack bar and slidable carriage thereon, of a device of the character described, comprising a body portion slidably mounted on said rack bar, a pivoted lever carried by the body portion, a toothed portion carried by the pivoted lever adapted for engagement with the rack bar, means to disengage the toothed portion, an adjustable shaft operable transversely to the lever, and means to move the slidable carriage into contact with the adjustable shaft.

10. The combination with a lens testing and measuring instrument, including a rack bar, a slidable carriage mounted thereon, of a device of the character described, comprising a body portion slidably mounted on the rack bar, a pivoted lever carried by the body portion, a toothed portion engageable with the rack bar, means to disengage the toothed portion, a screw-threaded shaft operable transversely to the lever, a contact member on the slidable carriage on the rack bar, and means to move the contact member into contact with the screw-threaded shaft.

HARRY W. HILL.